United States Patent [19]

Johnson et al.

[11] Patent Number: 5,165,968
[45] Date of Patent: * Nov. 24, 1992

[54] INK COMPOSITION HAVING RAPID DRY TIME AND HIGH PRINT QUALITY FOR PLAIN PAPER PRINTING

[75] Inventors: Loren E. Johnson, San Diego, Calif.; Kenneth A. Norton, Houston, Tex.; Norman E. Pawlowski, Corvallis, Oreg.; Margaret L. Wooding, Palo Alto, Calif.

[73] Assignee: Hewlett-Packard Company, Palo Alto, Calif.

[*] Notice: The portion of the term of this patent subsequent to Mar. 24, 2009 has been disclaimed.

[21] Appl. No.: 738,770

[22] Filed: Aug. 1, 1991

Related U.S. Application Data

[63] Continuation-in-part of Ser. No. 395,225, Aug. 17, 1989, abandoned.

[51] Int. Cl.$^5$ .................. B05D 5/00; C09D 11/02
[52] U.S. Cl. .................. 427/288; 106/20 D; 106/22 R; 346/75
[58] Field of Search ............ 106/20, 22; 427/288; 346/75

[56] References Cited

U.S. PATENT DOCUMENTS

| | | | |
|---|---|---|---|
| 4,156,657 | 5/1979 | Lin | 106/22 |
| 4,196,006 | 4/1980 | Mansukhani | 106/22 |
| 4,256,493 | 3/1981 | Yokoyama et al. | 106/22 |
| 4,279,653 | 7/1981 | Makishima et al. | 106/22 |
| 4,500,355 | 2/1985 | Shimada et al. | 106/20 |
| 4,551,736 | 11/1985 | Suzuki | 106/22 |
| 4,599,112 | 7/1986 | Yokoyama et al. | 106/22 |
| 4,661,158 | 4/1987 | Kobayashi et al. | 106/22 |
| 4,702,742 | 10/1987 | Iwata et al. | 106/22 |
| 4,732,613 | 3/1988 | Shioya et al. | 106/20 |
| 4,838,938 | 6/1989 | Tomida et al. | 106/20 |

*Primary Examiner*—Michael Lusignan
*Assistant Examiner*—Helene Klemanski

[57] ABSTRACT

If a small amount of alcohol (about 0.05 to 6 wt %) is added to water-based inks for thermal ink-jet printing, the resultant print has a rapid dry time and improved smear resistance. In addition, a high quality print is obtained, even on plain paper.

26 Claims, No Drawings

INK COMPOSITION HAVING RAPID DRY TIME AND HIGH PRINT QUALITY FOR PLAIN PAPER PRINTING

CROSS-REFERENCE TO RELATED APPLICATION

The present application is a continuation-in-part application of Ser. No. 07/395,225, filed Aug. 17, 1989 now abandoned.

TECHNICAL FIELD

The present invention relates to ink compositions suitable for thermal ink-jet printing, and, more particularly, to ink compositions evidencing a rapid dry time and improved smear resistance, as well as yielding a high print quality on plain papers.

BACKGROUND ART

Thermal ink-jet printers operate by employing a plurality of resistor elements to expel droplets of ink through an associated plurality of nozzles. In particular, each resistor element, which is typically a pad of a resistive material measuring about 50 μm × 50 μm, is located in a chamber filled with ink supplied from an ink reservoir. A nozzle plate, comprising a plurality of nozzles, or openings, with each nozzle associated with one of the resistor elements, defines the top of the chamber. Upon energizing of a particular resistor element, a droplet of ink is expelled through the nozzle associated with that element toward the print medium, whether paper, transparent film, or the like. The firing of ink droplets is typically under the control of a microprocessor, the signals of which are conveyed by electrical traces to the resistor elements, thereby enabling the formation of alphanumeric and other characters on the print medium.

The tight tolerances of the nozzles (typically 40 to 50 μm diameter) require that the ink not clog the nozzles. Nozzle clogging is caused by loss of vehicle by evaporation. Such evaporation results in either an increase in viscosity such that the nozzle can no longer fire or the dye and other additives come out of solution due to increases in their effective concentration. Consequently, it is desirable to use co-solvents which have vapor pressures less than that of water and viscosities less than 35 centipoise (cp) in conjunction with alcohol as the penetrant, as described hereinbelow.

Further, repeated firings of the resistor elements, which must withstand many millions of firings over the life of the ink cartridge to be commercially practical, can result in fouling of the resistor element. This is unique to thermal ink-jet printers and is known as kogation.

The ink composition must be capable of interacting with the print medium, especially paper, to penetrate the medium without undue spreading and a subsequent decrease in print quality. Finally, the printed characters must dry rapidly in order to prevent smearing.

Inks are known which possess one or more of the foregoing properties. However, few ink compositions are known that possess all the foregoing properties, since an improvement in one property often results in the degradation of another property. Thus, many inks used commercially represent a compromise in an attempt to achieve an ink evidencing at least an adequate response in each of the foregoing considerations. Accordingly, investigations continue into developing ink formulations which have improved properties and which do not elevate one property at the expense of the others.

DISCLOSURE OF INVENTION

In accordance with the invention, rapid dry time (thirteen seconds or less) for an ink used in thermal ink-jet printing is achieved by providing the ink with a small amount of alcohol as a penetrant. Adding about 0.05 to 6% (by weight) of an alcohol or mixture of alcohols decreases the dry time while improving print quality. The preferred amount of alcohol in any instance will depend on the particular alcohol. The low amount of alcohol avoids the crusting problems and reduced print quality experienced with inks containing higher amounts of alcohols. Alcohols suitably employed in the practice of the invention include the lower alkanols having from two up to about six carbon atoms and benzyl alcohol.

It is possible to use glycol ethers in the practice of this invention. Some glycol ethers, such as dipropylene glycol monomethyl ether, show penetrating properties similar to the alcohols disclosed and claimed and also have the low vapor pressures needed to prevent clogging. When these glycol ethers are used as the penetrant member of the solvent pair, a lower solvent viscosity on the order of about 5 cp or less is required.

The ink compositions of the invention correspond to the following formulation (by weight):
   (a) about 1 to 10% of a dye or mixture thereof;
   (b) about 0.05 to 6% of an alcohol or mixture thereof;
   (c) about 75 to 98% water; and
   (d) up to about 15% of a member selected from the group consisting of a glycol, ketone, glycol ether, or mixture thereof, the glycol, ketone, and/or glycol ether having a surface tension from about 28.5 dynes/cm to 50 dynes/cm, a viscosity of less than 35 centipoise, and a boiling point greater than about 150° C. Further, the glycol has a surface tension to viscosity ratio from at least 1 to about 10, Surface tension was measured by the ring method, using a Kruss Digital Tensiometer Model K10. The viscosity was measured on a Couette concentric cylinder viscometer, specifically a Brookfield Digital Viscometer Model LVTD.

Compositions of the present invention preferably have present at least about 1% of the glycol or ketone. The maximum level of the alcohol, glycol and/or ketone combination is about 15%, and preferably it will be about 12% or less.

Compositions of the present invention which contain glycol ethers preferably include them in concentrations of at least about 3% and less than about 10%, and preferably about 4 to 7%.

Additives frequently found in thermal jet inks may be incorporated in the present inks. Among such additives are fungicides, bactericides, buffers, and antioxidants.

BEST MODES FOR CARRYING OUT THE INVENTION

Inks formulated in accordance with the invention generally comprises (a) a vehicle comprising a mixture of water, alcohol, and, preferably, a glycol, ketone, and/or glycol ether; and (b) a dye. The inks employ one or more alcohols having the formula ROH, where R is lower alkyl having at least two carbon atoms or benzyl. Such alcohols include ethanol, 1-propanol, 2-propanol, tert-butanol, n-pentanol, and benzyl alcohol as print media penetrants.

Examples of glycols suitably employed in the invention include ethylene glycol, diethylene glycol (DEG), and triethylene glycol. Examples of glycol ethers employed in the practice of the invention include propylene glycol monomethyl ether, diethylene glycol mono methyl ether, and dipropylene glycol monomethyl ether (DPM).

Ketones, such as γ-butyrolactone and 4-hydroxy-4-methyl-1,2-pentanone (HMP) may also be present or added in place of the glycol.

The water, which is present in an amount ranging from about 75 to 98%, acts as a dye carrier, volume extender, surface tension modifier, and viscosity modifier. The alcohol, which is present in an amount ranging from about 0.05 to 6%, and preferably about 1 to 4%, acts as a paper penetrant. The glycol, which can be present in an amount ranging from about 1 to 15%, and preferably about 4% to 10%, acts as a viscosity modifier and non-volatile dye solvent. The ketone may alternatively be present in the same range as the glycol. The glycol ether, which can be present in an amount ranging from about 3 to 10%, and preferably about 4 to 7%, acts as both a paper penetrant and low vapor pressure solvent. The total amount of glycol, ketone, and/or glycol ether in any event does not exceed about 15%, and preferably is less than about 12% and at least about 1%, together with at least about 94% water.

The dye may comprise any of the dyes commonly used in thermal ink-jet compositions, including sulfonated and carboxylated anionic dyes. Examples include Food Black 2 (FB2), Direct Red 9, Acid Red 27, Direct Blue 86, Direct Blue 199, Direct Yellow 86, Direct Yellow 4, Acid Blue 9, and Acid Blue 185. This list, however, is not intended to be all inclusive, and the invention is not limited to the use of the enumerated dyes. For example, dyes commonly employed in thermal ink-jet printing are sulfonate or carboxylate dyes, having a plurality of cations associated with each dye molecule. While many such dyes are commercially available wherein the cation is sodium, other cations, such as lithium, triethanolamine, and tetramethylamine may also be employed. An example of such a substituted dye is lithium-substituted Food Black 2 (Li-FB2), in which substantially all sodium cations are replaced with lithium cations.

The ink composition of the invention is different from other alcohol-containing inks in that the alcohol is present in relatively small quantities. The alcohol, in acting as a paper penetrant, permits drying by absorption rather than by evaporation. Inks using relatively larger amounts of alcohol rely on evaporation as the drying mechanism, and this restricts the choice of the alcohol to one having a relatively high vapor pressure to ensure drying within a reasonable time.

By employing the concentration of alcohols in accordance with the invention, alcohols having a relatively low vapor pressure, such as benzyl alcohol and tert-butanol, are preferred because they minimize crusting problems and nozzle clogging. In addition, unlike alcohols which have high vapor pressure, they provide the ink formulations with greater stability and print quality over the pen life.

Due to the relatively low amount of alcohol employed, it is possible to reduce crusting of the nozzles by use of one or more glycols. In the prior art inks containing relatively higher amounts of alcohols, crusting is a problem that is not easily alleviated by the use of a glycol. This phenomenon is caused by two factors. The first factor is that as large volumes of alcohol evaporate from such inks, the concentration of glycol and dye in the solution rises. Such a situation usually results in the precipitation of the dye. As to the second factor, the increase in glycol and dye concentration also cause a dramatic increase in viscosity that can effectively clog a nozzle.

In formulating the inks of this invention, viscosity is a consideration. If the viscosity becomes too high, the pen is effectively clogged. As water is lost from the ink, there is a rise in viscosity. The rate of the rise is dependent on the glycol or ketone in the vehicle. For example, 1,6-hexanediol (a solid) has a high effective viscosity in solution; if an ink containing this compound is allowed to evaporate, the viscosity of the formulation will rapidly rise to the point where it cannot be used in a thermal ink-jet pen. For this reason, glycols having a viscosity of 35 centipoise or greater are excluded from this invention as being unusable due to nozzle clogging or crusting, even though their drytime and print quality performance may be adequate.

Finally, the ink compositions of the invention yield high print quality on a number of print papers, including Xerox 4024 and cotton Bond.

The glycol, ketone, and/or glycol ether has a surface tension from about 28.5 dynes/cm to 50 dynes/cm, a viscosity of less than 35 centipoise, and a boiling point greater than about 150° C. Further, the glycol has a surface tension to viscosity ratio from at least 1 to about 10.

High viscosity solvents will not work in ink-jet pens due to crusting considerations. Extremely low surface tension materials cause a decrease in print quality. High surface tension materials do not have sufficient penetration into the print medium.

Surface tension and viscosity are related to print quality and drytime in the following way: for higher surface tension compounds, the viscosity must be lower because both surface tension and viscosity serve to retard movement of the ink in the print medium (paper). In the case of low surface tension components, the viscosity must be greater in order to slow penetration and avoid a degradation in print quality. Hence, the expression of this interrelationship in the given ratio. The alcohol is providing the initial penetrating force for the ink, and to achieve rapid drytime and good print quality, the glycol must have a surface tension to viscosity ratio in the rang given.

The alcohols themselves being the penetrant drivers, all have low viscosities and surface tensions. To maintain print quality, it is desirable to have an ink that penetrates quickly and then slows to a stop in the paper sheet. This is achieved using glycols which have a specific surface tension (driving force for spreading and movement) to viscosity (retarding force for movement) ratio.

INDUSTRIAL APPLICABILITY

The compositions of the invention are expected to find use as inks in ink-jet printers, particularly thermal ink-jet printers.

EXAMPLES

Table I sets forth the surface tension, viscosity, the surface tension to viscosity ratio, and boiling point for each of the solvent components in the examples.

TABLE I

Surface Tension, Viscosity, Ratio Thereof, and Boiling Point of Glycols Ketones, Alcohols, and Glycol Ethers Used in the Examples.

| Solvent | Surface Tension, dyne/cm | Viscosity, cp | Ratio | Boiling Point, °C. |
|---|---|---|---|---|
| Examples of Acceptable Solvents: | | | | |
| 4-hydroxy-4-methyl-1,2-pentanone (HMP) | | | | 168 |
| ethylene glycol (EG) | 48.4 | 17.4 | 2.78 | 197 |
| diethylene glycol (DEG) | 45.3 | 28.5 | 1.6 | 244 |
| dipropylene glycol mono methyl ether (DPM) | 28.9 | 4.0 | 8.2 | 188 |
| γ-butyrolactone (BLO) | 38.3 | 1.8 | 21.3 | 204 |
| iso-propanol (IPA) | 20.6 | 2.0 | 10.3 | 82 |
| n-propanol (n-P) | 22.5 | 2.2 | 10.2 | 97 |
| benzyl alcohol (BA) | 39.2 | 6.1 | 6.4 | 205 |
| ethanol (EtOH) | | | | 78 |
| Examples of Unacceptable Solvents: | | | | |
| 1,6-hexanediol (HD) | solid | solid* | NA | 243 |
| propylene glycol mono methyl ether (PGME) | 26.5* | 1.75 | 15* | 120* |
| 1,4-butanediol (BD) | 44.8 | 81.6* | 0.5* | 276 |
| propylene glycol (PG) | 36.4 | 46.4* | 0.8* | 187 |
| tripropylene glycol (TPG) | 33.6 | 57.4* | 0.6* | 267 |
| tetraethylene glycol (TEG) | 45.9 | 45.2* | 1.0 | 308 |
| tripropylene glycol mono methyl ether (TPGM) | 29.5 | 6.5* | 4.5 | 242 |
| 2-methyl-2,4-pentane-diol (MPD) | 27.7* | 33.8 | 0.8* | 198 |
| diethylene glycol phenyl ether acetate (DMPA) | 26.9* | 2.0 | 13.4* | |
| polyethylene glycol 200 (PEG) | 45.6 | 50.10* | 0.9* | |
| 1,2-pentanediol (1,2-PD) | 28.1* | 61.0* | 0.5* | |
| 1,5-pentanediol (1,5-PD) | 44.0 | 107.0* | 0.4* | 242 |
| 2,5-hexanediol (2,5-HD) | 34.4 | 700* | 0.05* | 221 |

*Unacceptable as being outside range

The following inks of this invention were made and tested. A value of 6 or lower for print quality (PQ) indicates acceptable print quality, and a value of 13 sec or lower for drying time (DT) indicates acceptable dry time.

The print quality was measured against in-house standards which were pages of text and graphs that were printed on the Hewlett-Packard LaserJet printer. (LaserJet is a trademark of Hewlett-Packard Company.) The print samples were compared to these standards by an in-house print quality judging committee. The committee assigned a numerical rating based on criteria such as sharpness or darkness.

Drying time was determined from the average times after which specimens which were 100%, 75%, and 25% area-fill printed with the test ink would not smear when rubbed with a closed-cell foam wiper.

Table II below lists compositions, including dye concentration, alcohol and concentration, and glycol and/or ketone ("vehicle"); the balance is water. The vehicles included 4-hydroxy-4-methyl-1,2-pentanone (HMP), diethylene glycol (DEG), diethylene glycol mono methyl ether (DPM), and γ-butyrolactone (BLO). The alcohols included iso-propanol (IPA), benzyl alcohol (BA), n-propanol (n-P), and ethanol (EtOH).

TABLE II

| | | Ink Compositions | |
|---|---|---|---|
| Example | % Li-FB2 | Vehicle | Alcohol |
| 1 | 2.5 | 6% HMP | 6% IPA |
| 2 | 2.2 | 7.5% DEG | 2.5% IPA |
| 3 | 2.2 | 8.5% DEG | 1.5% IPA |
| 4 | 2.2 | 5% DEG | 5% IPA |
| 5 | 2.2 | 5% DEG | 5% IPA |
| 6 | 2.2 | 5% DEG | 5% IPA |
| 7 | 2.2 | 5% DEG | 5% IPA |
| 8 | 2.2 | 6.5% DEG | 1.5% IPA |
| 9 | 2.2 | 8.5% DEG | 3.5% IPA |
| 10 | 2.2 | 6.5% DEG | 3.5% IPA |
| 11 | 2.5 | — | 4% n-P |
| 12 | 2.5 | 7.5% DEG | 2.5% n-P |
| 13 | 2.5 | — | 1% BA |
| 14 | 2.5 | 6% DEG, 2% DPM | 2% IPA |
| 15 | 2.5 | 6% DEG | 0.5% BA |
| 16 | 2.5 | 5% DEG | 1.5% n-P |
| 17 | 2.5 | 5% DEG | 1% BA |
| 18 | 2.5 | 5% DEG | 1.5% EtOH |
| 19 | 2.5 | 5% DEG | 0.5% BA, 0.5% n-P |
| 20 | 2.5 | 6% γ-BLO | 6% IPA |
| 21 | 2.5 | 6% HMP | 6% IPA |
| 22 | 2.5 | 6% DPM | 6% IPA |

Table III lists the results of each ink, printed on various paper media; print quality (PQ) and dry time (DT) are indicated.

TABLE III

| | Results of Printing. | | | |
|---|---|---|---|---|
| Example | 4024 PQ | 4024 DT | Bond PQ | Bond DT |
| 1 | 6 | 2 | 5 | 6 |
| 2 | 4 | 9.5 | 4 | 9.5 |
| 3 | 4 | 9 | 4.5 | 11.5 |
| 4 | 5 | 4 | 4 | 6 |
| 5 | 4.5 | 9.5 | 4 | 10.5 |
| 6 | 4.5 | 6.5 | 4 | 7.5 |
| 7 | 5 | 7.5 | 4 | 9.5 |
| 8 | 5 | 9.5 | 5 | 11 |
| 9 | 5 | 8 | 4.5 | 9 |
| 10 | 5 | 8.5 | 4 | 10 |
| 11 | 4.5 | 6 | 4 | 8 |
| 12 | 4.5 | 6 | 4.5 | 8 |
| 13 | 4.5 | 8 | 4.5 | 9 |
| 14 | 5 | 10 | 5 | 11.5 |
| 15 | 4 | 12 | 4 | 10.5 |
| 16 | 4 | 12.5 | 4 | 10 |
| 17 | 5 | 11 | 4 | 11.5 |
| 18 | 4 | 12.5 | 4 | 11.5 |
| 19 | 4 | 12 | 4 | 12 |
| 20 | 5 | 2 | 4 | 4.5 |
| 21 | 6 | 2 | 4.5 | 6 |
| 22 | 6 | 2 | 5 | 6 |

The following Tables IV and V provide a list of comparative examples, which do not possess the requisite surface tension, surface tension to viscosity ratio, and/or boiling point. The resulting inks are generally seen to exhibit poorer print quality and/or dry time than the inks within the scope of the invention. Additional glycols and ketones include propylene glycol monomethyl ether (PGME), 1,4-butanediol (BD), 1,6-hexanediol (1,6-HD), propylene glycol (PG), tripropylene glycol (TPG), tetraethylene glycol (TeEG), tripropylene glycol methyl ether (TPGME), 2-methyl-2,4-propanediol (MPD), diethylene glycol phenyl ether acetate (DMPA), polyethylene glycol (PEG), 1,2-pentanediol (1,2-PD), 1,5-pentanediol (1,5-PD), 2,5-hexanediol (2,5-HD), 2-methyl-2,4-pentanediol (MPD), and dipropylene glycol methyl ether (DPGME). Additional alcohols included methyl alcohol (MeOH).

TABLE IV

Compositions Outside the Scope of the Invention.

| Example | % Li-FB2 | Vehicle | Alcohol |
|---|---|---|---|
| 23 | 2.2 | 15% DEG | — |
| 24 | 2.5 | 10% 1,6-HD | — |
| 25 | 2.5 | 6% 1,6-HD | 6% IPA |
| 26 | 2.5 | 6% DPM | — |
| 27 | 2.5 | 6% DPM, 6% DEG | — |
| 28 | 2.5 | 6% DEG, 3% DPM | — |
| 29 | 2.5 | 5.5% DEG | — |
| 30 | 2.5 | — | 15% MeOH |
| 31 | 2.5 | 15% PGME | — |
| 32 | 2.5 | — | 20% BA |
| 33 | 2.5 | 16% BD | — |
| 34 | 2.5 | 18% PG | — |
| 35 | 2.5 | 17% TPG | — |
| 36 | 2.5 | — | 15% IPA |
| 37 | 2.5 | 35% DPM | — |
| 38 | 2.6 | 15% TeEG | — |
| 39 | 2.6 | 8% TPGME | — |
| 40 | 2.6 | 17% 1,6-HD | — |
| 41 | 2.6 | 17% MPD | — |
| 42 | 2.5 | 7% DMPA | — |
| 43 | 2.5 | — | 7% 1-P |
| 44 | 2.5 | 17% DPM | — |
| 45 | 2.5 | 7% MPD | — |
| 46 | 2.5 | 17% TPG | — |
| 47 | 2.5 | 17% PEG 200 | — |
| 48 | 2.5 | 17% 1,2-PD | — |
| 49 | 2.5 | 14% 1,5-pD | — |
| 50 | 2.5 | 10% 2,5-HD | — |
| 51 | 2.5 | 6% 2-MPD, 6% DEG | — |
| 52 | 2.5 | 6% 1,6-HD, 6% DEG | — |
| 53 | 2.5 | 6% TPGMME, 6% DEG | — |
| 54 | 2.5 | 6% DPGME, 6% DEG | — |
| 55 | 2.5 | 6% 1,6-HD | 1.5% n-P |
| 56 | 2.5 | 6% 1,6-HD | 0.5% BA |
| 57 | 2.5 | 7% DEG, 2% 1,6-HD | 2% IPA |

TABLE V

Results of Printing.

| Example | 4024 PO | 4024 DT | Bond PO | Bond DT |
|---|---|---|---|---|
| 23* | 5 | 20.5 | 4.75 | 20.0 |
| 24** | 5.5 | 6 | 4 | 10.5 |
| 25** | 5.5 | 2 | 4 | 5 |
| 26 | 6 | 7.5 | 5.5 | 15.5 |
| 27 | 8 | 2 | 8 | 2.5 |
| 28 | 6 | 14 | 4.5 | 13.5 |
| 29 | 4 | 14.5 | 4 | 13 |
| 30 | 5 | 9.0 | 5 | 11.0 |
| 31 | 10 | 3.0 | 5 | 22.5 |
| 32 | 12 | 0 | 10 | 0.5 |
| 33 | 6 | 21.0 | 5 | 22.5 |
| 34 | 7 | 22.5 | 5 | 39.0 |
| 35 | 13 | 3.5 | 7 | 24.0 |
| 36 | 10 | 0.5 | 9 | 2.5 |
| 37 | 10 | 0.5 | 10 | 0.5 |
| 38 | 6 | 15 | 6 | 16 |
| 39 | 12 | 2 | 7 | 8 |
| 40 | 8 | 5 | 6 | 8 |
| 41 | 11 | 0 | 10 | 1 |
| 42 | 10 | 0.5 | 8 | 0.5 |
| 43 | 8 | 0.5 | 5 | 6 |
| 44 | 9 | 0.5 | 6 | 0.5 [?] |
| 45 | 12 | 1 | 6 | 17.5 |
| 46 | 13 | 1.5 | 7 | 13.5 |
| 47 | 6 | 24 | 6 | 22.5 |
| 48 | 7 | 8.5 | 4 | 17.5 |
| 49 | 13 | 2 | 5 | 15 |
| 50 | 10 | 2 | 5 | 13 |
| 51 | 13 | 2 | 6 | 17.5 |
| 52 | 6 | 8 | 5 | 15 |
| 53 | 13 | 2.5 | 6 | 17.5 |
| 54 | 12 | 6 | 6 | 13.25 |
| 55** | 6 | 6 | 4.5 | 10.5 |
| 56** | 6 | 7 | 4 | 8.5 |
| 57# | 5 | 8.5 | 5 | 8.5 |

*average of 4 runs
**unacceptable due to high viscosity
unacceptable due to crusting Thus, there has been disclosed a thermal ink-jet composition for thermal ink-jet printing. It will be clear to those of ordinary skill in the art that various changes and modifications may be made without departing from the spirit and scope of the invention and that all such changes and modifications fall within the scope of the invention, as defined by the appended claims.

What is claimed is:

1. A thermal ink-jet ink composition suitable for thermal ink-jet printing comprising, by weight:
    (a) about 1 to 10% of at least one water-soluble dye;
    (b) about 0.05 to 6% of an alcohol corresponding to the formula ROH, wherein R is lower alkyl having from two to about six carbon atoms or benzyl;
    (c) about 75 to about 98% water;
    (d) at least about 1% and up to about 15% of at least one member selected from the group consisting of glycols, ketones, and glycol ethers, said glycol, ketone, or glycol ether having a surface tension from about 28.5 dynes/cm to 50 dynes/cm, a viscosity of less than about 35 centipoise, and a boiling point of at least about 150° C. and wherein said glycol has a surface tension to viscosity ratio from 1 to about 10.

2. The ink composition of claim 1 wherein said dye is a sulfonated or carboxylated anionic dye.

3. The ink composition of claim 1 wherein said alcohol is selected from the group consisting of ethanol, n-propanol, iso-propanol, tert-butanol, n-pentanol, benzyl alcohol, or a mixture thereof.

4. The ink composition of claim 1 wherein said alcohol is present in the range from about 1 to about 4%.

5. The ink composition of claim 1 wherein said glycol is diethylene glycol or ethylene glycol.

6. The ink composition of claim 1 wherein said ketone is γ-butyrolactone or 4-hydroxy-4-methyl-1,2-pentanone.

7. The ink composition of claim 1 wherein said glycol ether is diethylene glycol mono methyl ether.

8. The ink composition of claim 1 wherein the concentration of glycol, ketone, and glycol ether combined does not exceed about 12%.

9. The ink composition of claim 1 which contains at least 1% of at least one of said glycol, ketone, and glycol ether and at least about 94% water.

10. The ink composition of claim 1 wherein said glycol ether is present in the range from about 3 to less than about 10%.

11. The ink composition of claim 10 wherein said glycol ether is present in the range from about 4 to 7%.

12. The ink composition of claim 1 wherein glycol and said ketone each range from about 4 to 10%.

13. An ink composition suitable for thermal ink-jet printing comprising, by weight:

(a) about 1 to 10% of a sulfonated or carboxylated anionic dye;
(b) about 1 to 4% of at least one alcohol selected from the group consisting of ethanol, D-propanol, iso-propanol, tert-butanol, n-pentanol, and benzyl alcohol;
(c) from about 1 to less than about 12% of at least one member selected from the group consisting of diethylene glycol, ethylene glycol, γ-butyrolactone, 4-hydroxy-4-methyl-1,2-pentanone, and diethylene glycol mono methyl ether; and
(d) the balance water.

14. A method of printing an ink on plain paper by a thermal ink-jet printer, whereby said ink dries in less than about 13 seconds and has acceptable print quality, said method comprising jetting said ink onto said plain paper, said ink comprising, by weight:
(a) about 1 to 10% of at least one water-soluble dye;
(b) about 0.05 to 6% of an alcohol corresponding to the formula ROH, wherein R is lower alkyl having from two to about six carbon atoms or benzyl;
(c) about 75 to about 98% water;
(d) at least about 2% and up to about 15% of at least one member selected from the group consisting of glycols, ketones, and glycol ethers, said glycol, ketone, or glycol ether having a surface tension from about 28.5 dynes/cm to 72 dynes/cm, a viscosity of less than about 35 centipoise, and a boiling point of at least about 150° C., and wherein said glycol has a surface tension to viscosity ratio from at least 1 to about 10.

15. The method of claim 14 wherein said dye is a sulfonated or carboxylated anionic dye.

16. The method of claim 14 wherein said alcohol is selected from the group consisting of ethanol, n-propanol, iso-propanol, tert-butanol, n-pentanol, benzyl alcohol, or a mixture thereof.

17. The method of claim 14 wherein said alcohol is present in the range from about 1 to about 4%.

18. The method of claim 14 wherein said glycol is diethylene glycol or ethylene glycol.

19. The method of claim 14 wherein said ketone is γ-butyrolactone or 4-hydroxy-4-methyl-1,2-pentanone.

20. The method of claim 14 wherein said glycol ether is diethylene glycol mono methyl ether.

21. The method of claim 14 wherein the concentration of glycol, ketone, and glycol ether combined does not exceed about 12%.

22. The method of claim 14 which contains at least 1% of at least one of said glycol, ketone, and glycol ether and at least 94% water.

23. The method of claim 14 wherein the glycol ether is present in the range from about 3 to less than about 10%.

24. The method of claim 23 wherein the glycol ether is present in the range from about 4 to 7%.

25. The ink composition of claim 14 wherein glycol and said ketone each range from about 4 to 10%.

26. A method of printing an ink on plain paper by a thermal ink-jet printer, whereby said ink dries in less than about 13 seconds and has acceptable print quality, said method comprising jetting said ink onto said plain paper, said ink comprising, by weight:
(a) about 1 to 10% of a sulfonated or carboxylated anionic dye;
(b) about 1 to 4% of at least one alcohol selected from the group consisting of ethanol, n-propanol, iso-propanol, tert-butanol, n-pentanol, and benzyl alcohol;
(c) from about 1 to less than about 12% of at least one member selected from the group consisting of diethylene glycol, γ-butyrolactone, 4-hydroxy-4-methyl-1,2-pentanone, and diethylene glycol mono methyl ether; and
(d) the balance water.

* * * * *